United States Patent [19]

Howbrook

[11] Patent Number: 4,697,144
[45] Date of Patent: Sep. 29, 1987

[54] POSITION SENSING APPARATUS

[75] Inventor: Ernest Howbrook, Stockport, England

[73] Assignee: Verify Electronics Limited, Stockport, England

[21] Appl. No.: 721,653

[22] Filed: Apr. 10, 1985

[30] Foreign Application Priority Data

Apr. 19, 1984 [GB] United Kingdom ............ 8410364
Sep. 21, 1984 [GB] United Kingdom ............ 8423958

[51] Int. Cl.$^4$ .................................................. G01B 7/14
[52] U.S. Cl. ................................................... 324/207
[58] Field of Search .............................. 324/207, 208

[56] References Cited

U.S. PATENT DOCUMENTS

| | | |
|---|---|---|
| 2,911,632 | 11/1959 | Levine et al. |
| 4,014,015 | 3/1977 | Gundlach ............ 324/208 |
| 4,223,300 | 9/1980 | Wiklund ............. 324/208 |
| 4,240,065 | 12/1980 | Howbrook. |

FOREIGN PATENT DOCUMENTS

| | | |
|---|---|---|
| 0009102 | 4/1980 | European Pat. Off. |
| 0012138 | 6/1980 | European Pat. Off. |
| 0028971 | 11/1980 | European Pat. Off. |
| 1032084 | 6/1966 | United Kingdom. |
| 1169155 | 10/1969 | United Kingdom. |
| 1218986 | 1/1971 | United Kingdom. |
| 1259787 | 1/1972 | United Kingdom. |
| 1301163 | 12/1972 | United Kingdom. |
| 1348866 | 3/1974 | United Kingdom. |
| 1406217 | 9/1975 | United Kingdom. |
| 1513567 | 6/1978 | United Kingdom. |
| 2012431 | 7/1979 | United Kingdom. |
| 1559091 | 1/1980 | United Kingdom. |
| 2064125 | 6/1981 | United Kingdom. |
| 2074736 | 11/1981 | United Kingdom. |

Primary Examiner—Reinhard J. Eisenzopf
Assistant Examiner—Robert W. Mueller
Attorney, Agent, or Firm—William R. Hinds

[57] ABSTRACT

Position sensing apparatus in which an unenergized member, such as a ferrite (60), moves relative to an energized primary coil system (12) and a secondary coil system (11). The primary coil system is single phase energized. The coils (11A, 11B etc.) of the secondary coil system are disposed in series connected pairs (coils 11A, 11G in pair 11/1) interspaced with other pairs (coils 11B, 11H in pairs 11/2) as an array of coils along a path (x) which may be straight, curved, circular etc. The coils in the pairs, which are balanced to give a zero output, form sequences (sequences I, II, III etc.) each of which are terminated with a phase-shift network (PC) to give an incremental phase shift as between one sequence and the next. The incremental phase-shifted outputs are combined to give a progressive phase-shifted output (66) which is representative of the position of the ferrite (60). Ambiguity avoidance, when the progressive phase shift exceeds 360°, is preferably provided (FIGS. 8 and 9) by having two secondary coil systems (81A, 81B) with the same number of coils but with differing incremental phase-shifted outputs so that the utilized progressive phase-shifted output is the phase difference (C in FIG. 9) between the two systems.

9 Claims, 19 Drawing Figures

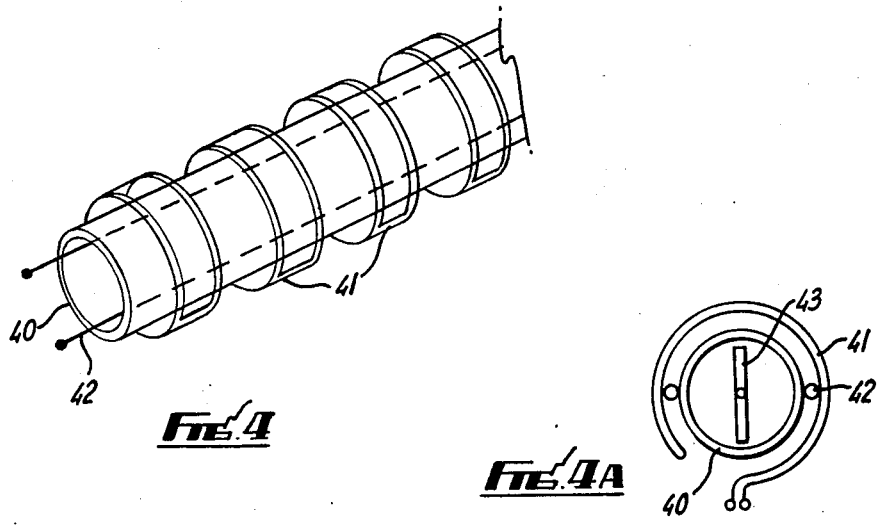
_Fig.4_
_Fig.4A_
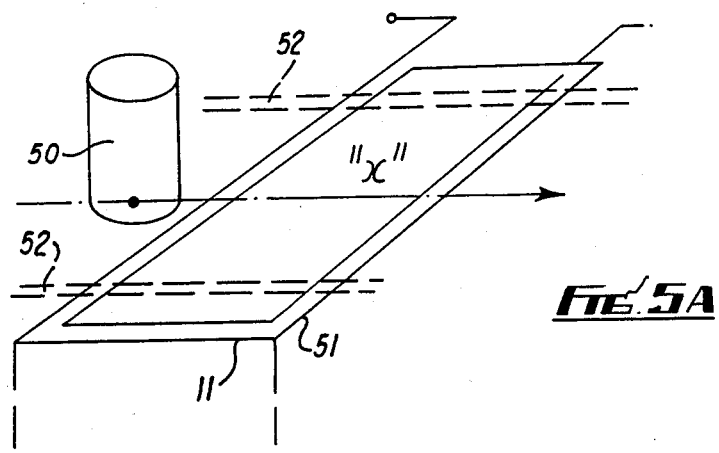
_Fig.5A_
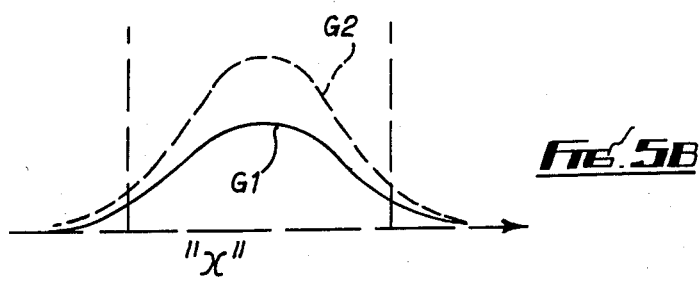
_Fig.5B_

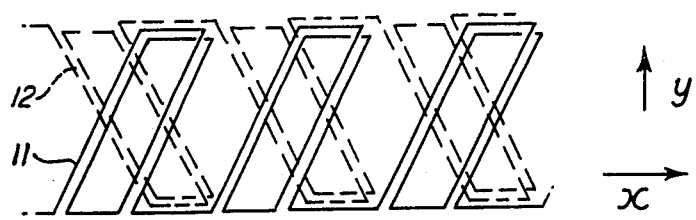
FIG.10
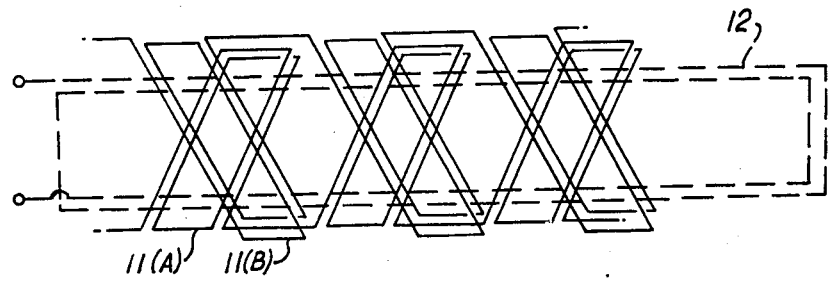
FIG.11
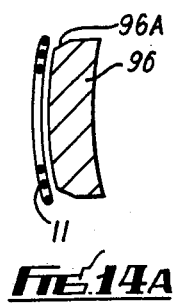
FIG.12M
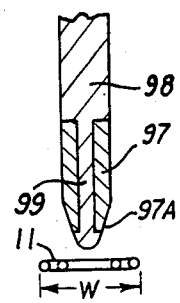
FIG.12N
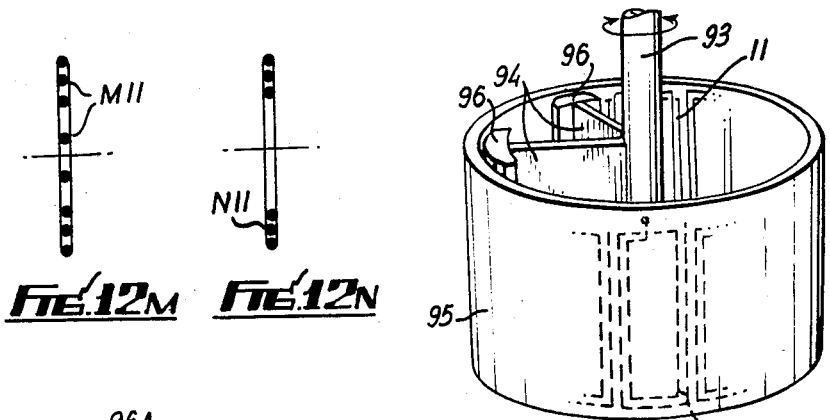
FIG.13
FIG.14A
FIG.14B

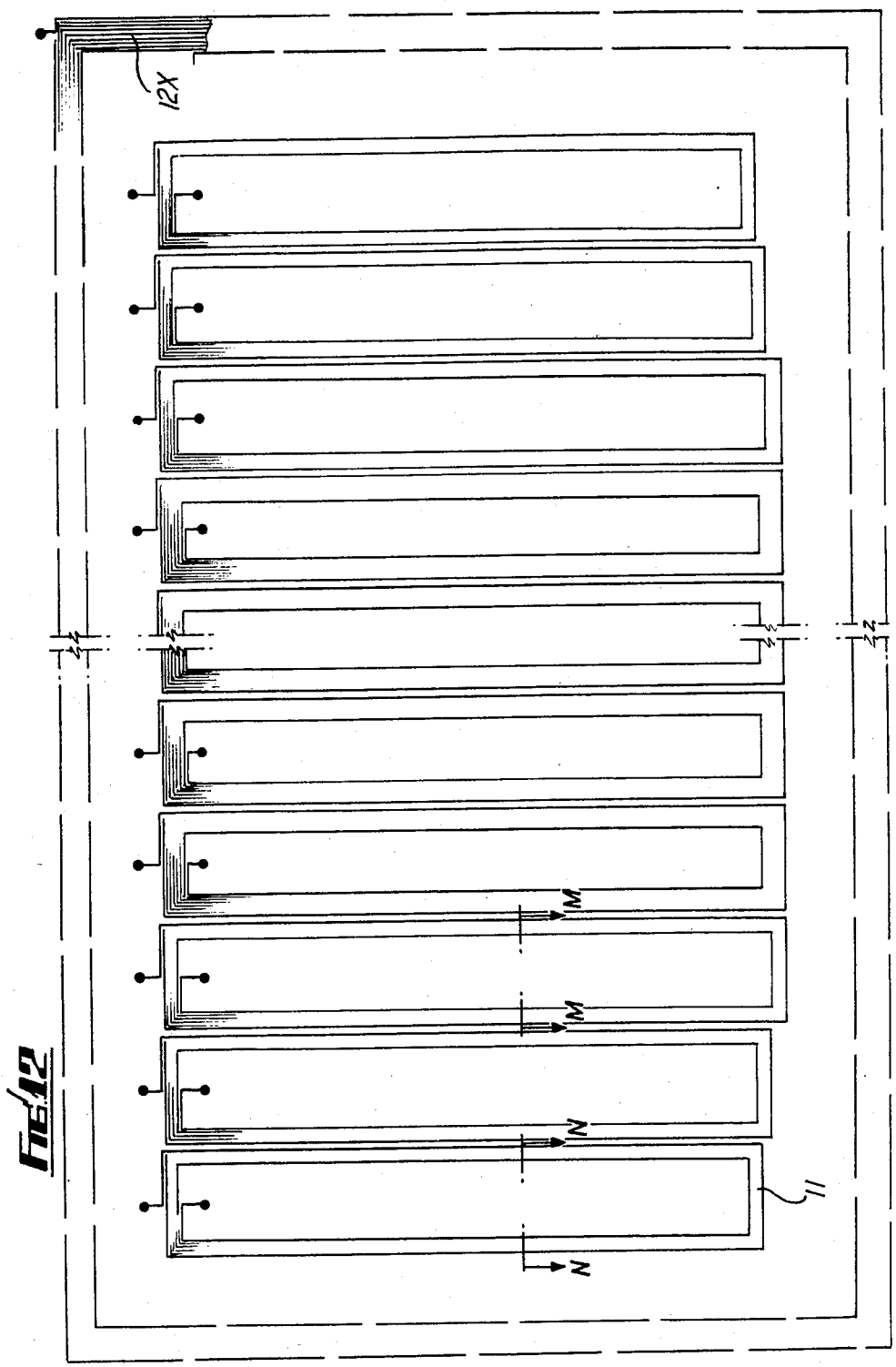

POSITION SENSING APPARATUS

This invention relates to position sensing apparatus of the kind having primary and secondary coil systems defining a path in which position of a member on, and dimensionally much smaller than, said path is represented by a characteristic phase output.

Such apparatus is broadly known and in this respect reference is made, by way of example, to the present Applicant's British Patent Specifications Nos. 1,259,787 and 1 406 217 and European Pat. No. 0012138.

Of the inventions disclosed in these three references, that in EU 0012138 has met with significant commercial success but it does require a pen or cursor carrying the secondary system to which leads have to be connected. These are troublesome and become even more troublesome where the apparatus has to function in harsh or hostile environments. As a first step in the present invention the Applicant has turned to the concept, not novel in itself (see GB No. 1 406 217), of having an unenergised moving member, such as one of magnetic material, as a pen or cursor so that no connecting leads are required thereto. The invention of No. 1 406 217 has worked satisfactorily in laboratory conditions but has not had the robustness or elegance for commercial use. It requires, for example, a multiphase energisation of three or more primary coil systems and a secondary multi-turned coil (sometimes in two parts or arranged on-side vertically). The tolerances required to give a nominally zero output in the absence of the moving member of magnetic material (an essential for operation) are difficult to achieve at low cost. Further, the need to remove ambiguity when the total phase change exceeds 360° has to be met by a further primary and secondary coil system. Yet further, an acceptable standard of position sensing is only achieved by the member of magnetic material penetrating through the secondary coil system. The invention disclosed in GB No. 1 406 217 is not ideal for use in a harsh, hot, or hostile environment.

The present invention uses a single phase energised primary coil system which can be a single coil or an array of coils each with only a single or a few turns preferably presented with very shallow depth on a printed circuit board. The secondary coil system, which is in the form of an array of coils, provides the output phase related to the movement of a pen or other unenergised member. Ambiguity arising when a phase change exceeds 360° can be met with a further secondary coil system without a further primary coil system. The coils of the apparatus can be laid down on a printed circuit board to give low cost manufacture, high stability, robustness, flexibility in design, the necessary close coupling, and high accuracy.

The present invention provides position-sensing apparatus of the kind above stated in which the movable member is an unenergised member devoid of electrical connections which can serve as a flux-coupler between the coil systems and whose position on the path defined by the coil systems is represented by output from the secondary coil system, said output being nominally zero in the absence of said member, characterised in that:

(a) the primary coil system is adapted to be single-phase energised;

(b) the coils of the secondary coil system are:

(i) disposed series connected in pairs interspaced with other pairs as an array of coils along said path (straight, curved, circular etc), (ii) placed relative to the primary coil system so that on energisation of the primary coil system the two coils of any pair have reversed polarity signals to generate said nominally zero output, and (iii) located relative to a path of movement of the unenergised member so that they are close coupled with said member;

(c) phase shift networks for each pair, or series connected sequence of pairs of secondary coils, said networks giving an incremental phase shifted output as between one pair, or sequence of series connected pairs, and the next; and (d) means combining the incremental phase shifted outputs to give a progressive phase shifted output so that the position of the unenergised member is represented by said progressive output.

The unenergised member is preferably of magnetic material such as a ferrite. It is possible for the non-magnetic material to be a conductive ring, but signal strengths would then be much weaker.

The primary coil system may comprise a coil which lays over or around the coils of the secondary coils system or it may comprise an array of coils individual to respective coils of the secondary coil system such as provided by bifilar winding of primary and secondary coils. In the latter case, the reversed polarity signals can either be generated by reversing the polarity of the secondary or the primary coils. In the former case the reversed polarity signals are generated by reversing the polarity of the secondary coils.

The primary coil system may be in two parts so that the unenergised member can pass between the two parts.

The coils of the secondary coil system may be arranged in successive pitches, each pitch representing 360° phase change with means resolving ambiguity between pitches. Said means could be provided by having further primary and secondary coil systems differing from the first so that two progressive phase shifted outputs are obtained which can be processed to give an unambiguous output. Said means could also be provided in the form of a further secondary coil system only, with the same spacing between coils as in the first secondary coil system and with the same number of coils but having more or less coils per pitch so that a progressive phase change output can be obtained which is the phase difference between the two secondary coil systems. When presented on a printed circuit board this provides a very compact system with substantially no space penalty being required for the ambiguity removal means and with relatively simple circuitry.

As there is close coupling between the unenergised member and the secondary coils there is a tendency for smooth progression to be lost at the output. This can be avoided by suitable shaping of the magnetic member. One form of member shaping is provided by having edge chamfering so that the closeness of coupling is changed at the edge region of the member.

The unenergised member may have multiple parts with the parts moving together but spaced apart. Typically one part is spaced from another so as to be representative of 360° advance. In this way very similar signals are generated from both, or all, multiple parts. The signals can then be added together to give an output signal which has an improved signal-to-noise ratio and which averages out local errors to improve linearity.

Where an array of secondary coils has a primary coil over or around the array, the coils in the array will not have identical e.m.f's induced in them as their individual space locations relative to the primary differ. This would act, if not corrected, to give a measureable output in the absence of the unenergised member and this must not occur. Correction can be effected by having differing numbers of turns in the coils of the secondary system. Where this expedient does not make an exact correction then there could be an adjustment to the closeness of the windings in the secondary coils or other shape adjustments, such as length, made to the coils.

Various forms of the invention will now be described by way of example with reference to the accompanying drawings in which:

FIG. 4 is similar to FIG. 1 but shows the secondary coils in a wrapped-round configuration;

FIG. 4A is an explanatory end view diagram;

FIGS. 5A and 5B illustrate the electrical output effect of an unenergised pen passing over a single secondary coil;

FIGS. 10 and 11 arrays in which movement of an unenergised member which deviates from a true co-ordinate direction can be identified;

FIG. 12 shows coil arrangements in one axis of a two axis array;

FIGS. 12M and 12N show enlarged cross sections on the lines M and N of FIG. 12.

FIG. 13 illustrates an arrangement having an unenergised member having two parts with the parts spaced apart and moving together;

FIG. 14A shows a shaped member of magnetic material which can be used in a movement encoder such as on a rotary or linear moving shaft; and FIG. 14B shows a shaped member of magnetic material which can be used as a pen.

Figure 1:
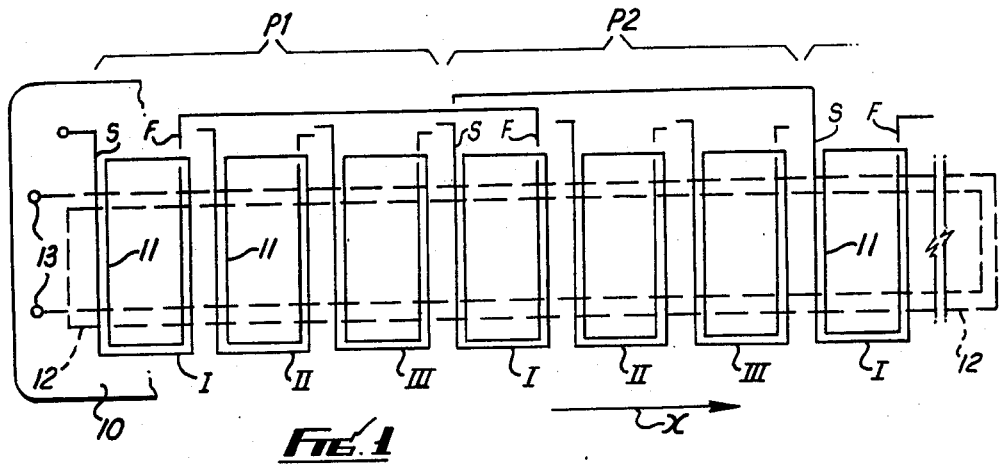
FIG. 1 is a circuit diagram showing a single primary coil and a linear array of secondary coils.
Figure 1A:
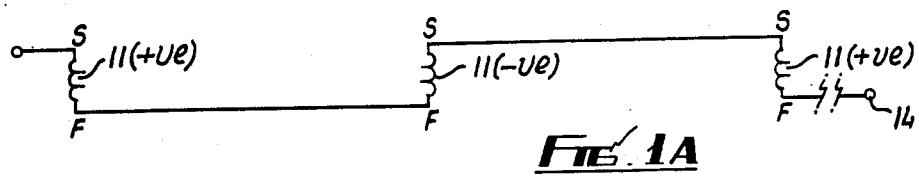
FIG. 1A is a circuit diagram showing certain coils of the secondary system arranged serially in reversed polarity pairs.

In FIG. 1 a position sensing apparatus 10 has a secondary coil system consisting of three interspaced, series connected, sequences I, II, III, of coils 11 each having terminals S and F and shaped to have a length greater than its width and each mounted with its major axis lateral to that of adjacent coils and functionally defining a co-ordinate direction "x". (In practice more than three sequences of coils would be used—see FIG. 6). The coils 11 in each sequence are connected in reversed polarity as illustrated in FIG. 1A (which has isolated the coils in sequence I from the other coils).

The coils 11 and 12 are preferably of shallow depth such as provided by a printed circuit board. The coils 11 present "pitches" P1, P2 each representing 360° of phase change.

The apparatus 10 has a primary winding 12 with a length greater than its width and mounted across the coils 11 with its major axis in the co-ordinate direction "x". The winding 12 could lie around the coils 11 as shown in FIG. 12 for example. The primary winding 12 is stimulated from a single phase A.C. supply 13. With no movable magnetic member in the vicinity of the windings the voltage at the output 14 (FIG. 1A) of the secondary coil sequence is zero or acceptably very small (such as about 1% of the output when a magnetic member is present). The coupling between the magnetic member and the secondary coils is close and is equal for all coils 11 in any one sequence although some loss of equality can be accepted where the apparatus is used in conjunction with a micro adapted to adjust for linearity errors. The end coils 11 in FIG. 1 are closer to the end of the primary winding than the central ones and therefore have a slightly greater flux linkage. To correct for this the coils 11 in the secondary system can differ from one another, such as having a differing number of turns, differing shape, differing density of turns etc. as shown in FIG. 12.

Figure 2:
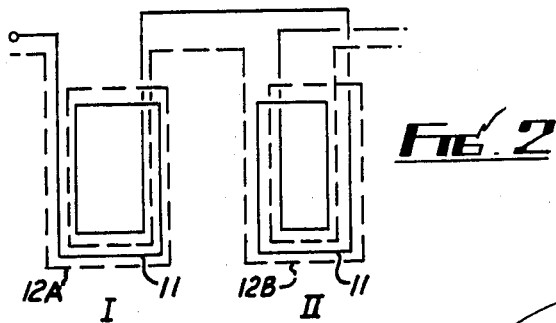
FIG. 2 is a circuit diagram showing an array of primary coils each bifilar wound with an associated secondary coil.

In FIG. 2 the primary system is shown as a number of coils 12A, 12B etc. bifilar wound with coils 11. The coils 12A etc. are connected in series with no reversals whilst the coils 11 retain the reversals of polarity referred to above. In an alternative the coils 12A could have reversed polarity and the coils 11 are then not reversed. The bifilar winding gives a closer coupling but is mainly advantageous in reducing the number of layers required when a printed circuit board design is adopted and thereby reduce the cost of the apparatus.

Figure 3:
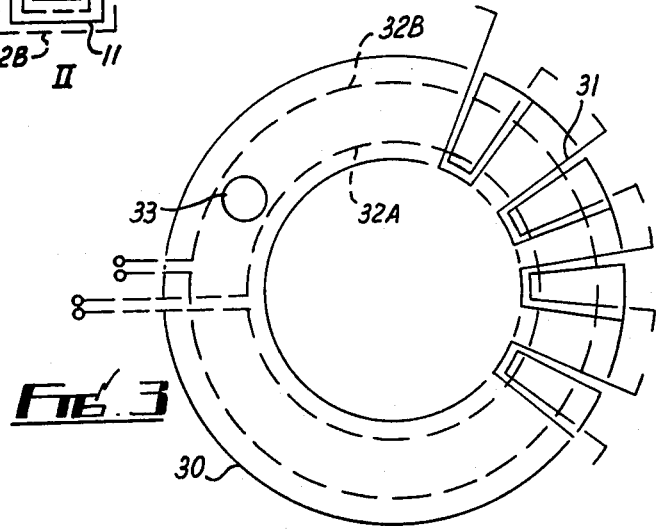
FIG. 3 is similar to FIG. 1 but shows a circular array.

FIG. 3 shows a circular construction of the apparatus having a base 30 and radial secondary coils 31 and a primary winding in two parts 32A and 32B to allow magnetic material 33 to pass between them. Again the primary windings 32A, 32B could be around (outside) the secondary coils 31.

FIG. 4 shows a cylindrical construction of the apparatus comprising a tubular base 40 having secondary coils 41 with a primary winding 42 which can be bifilar wound with the coils 41 or, as actually shown in FIG. 4, the primary can lay across the secondary coils. FIG. 4A shows a magnetic member, such as a ferrite rod 43. If the rod 43 is constrained to move only along the base 40 then the construction shown in FIG. 4 is suitable. If the rod 43 is free to rotate about the axis of the base 40 then the bifilar construction is preferred.

The effect of the presence of magnetic material will now be considered with reference to FIGS. 5A and B.

In FIG. 5A a cylindrical piece of ferrite 50 is moved in the "x" direction above a secondary coil 51 having a current induced in it from a primary winding 52. In FIG. 5B the effect of this movement is shown by graphs of output voltage from the coil 51: graph G1 shows the output voltage received from bifilar wound primary/-secondary and graph G2 shows the output voltage which is received from the FIG. 5A arrangement. (In both graphs G1 and G2 a standing output voltage exists by virtue of coupling in the absence of the ferrite 50 but this has been subtracted).

Figure 6:
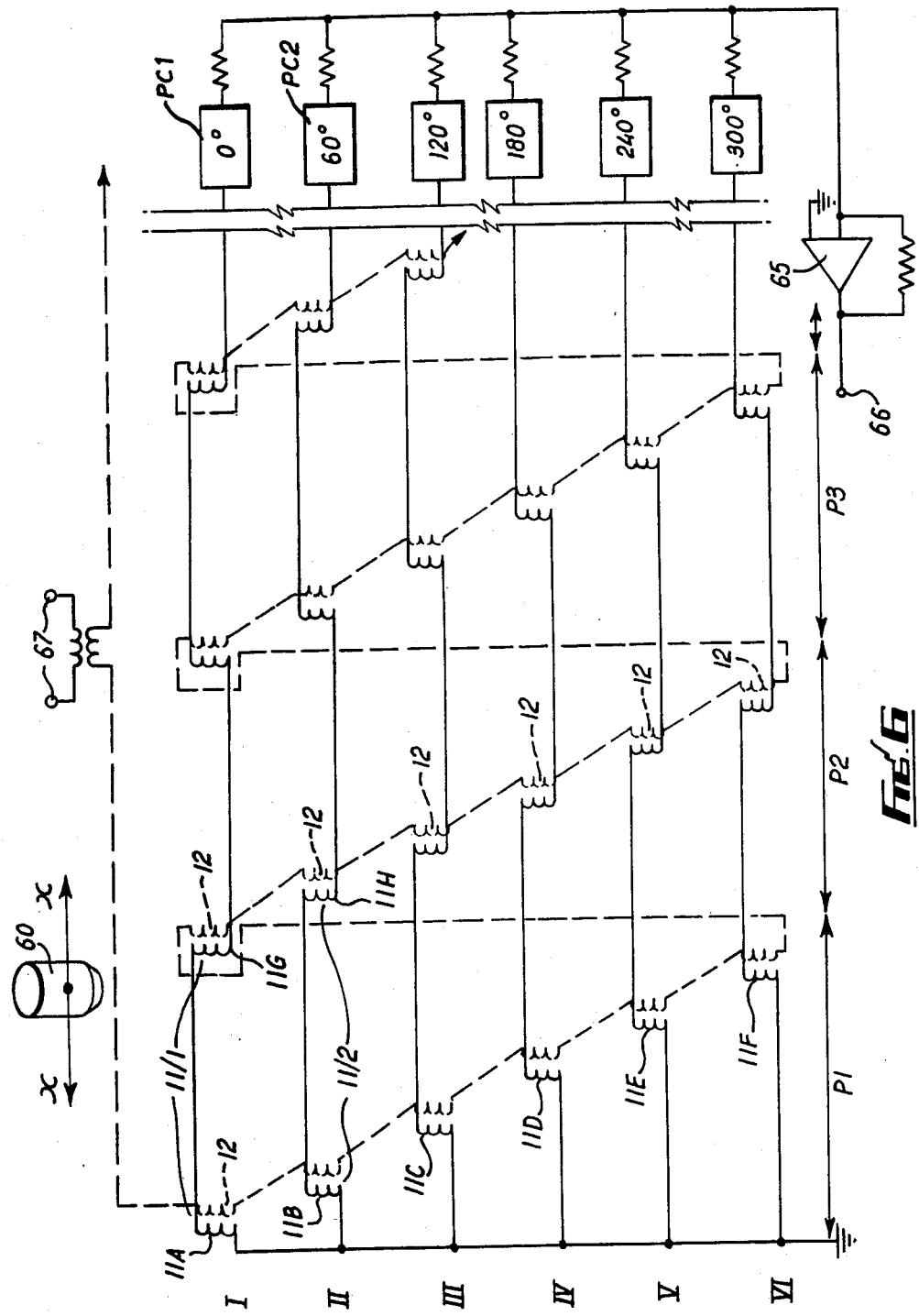
FIG. 6 is a circuit diagram showing primary and secondary coil arrays with respective incremental phase advance (or retard) units in a multiple pitch secondary array.

In FIG. 6 a more detailed circuit arrangement is shown than that of FIG. 1. Pitches P1, P2 etc. (each representing 360° of phase change) of secondary coils 11A, 11B etc. are provided with six coils per pitch and the pitches follow each other in a given line (e.g. straight line for FIG. 1 or a circular line for FIG. 3). The secondary coils 11 are bifilar wound with series connected primary coils 12. Respective coils 11 in each pitch are reverse polarity connected in pairs such as interspaced pairs 11/1, 11/2, and in sequence I, II etc. and the final coil in each sequence is connected to a respective incremental phase change (advance or retard) unit PC1, PC2 etc. With six coils 11 per pitch the phase change between adjacent chains is 60°; five coils is 72°; four coils is 90°; "n" coils is 360/n°. The output from all the units PC is taken through a feedback amplifier 65 to an output 66. A reference input 67 is applied to the coils of the primary system. The phase at output 66 measured in relation to the input 67 is representative of the position of a member of magnetic material along the array of coils. In the absence of magnetic material no significant output is obtained at output 66.

The input 67 is of high quality sinusoidal form of about 10 kHz. Instead of reversing the polarity of the coils 11 the polarity of coils 12 could be reversed.

The output is suitable for analogue or digital applications such as transducers or encoders, operating in a linear or rotary mode. Apparatus according to the invention can be made to operate immersed in oil, in smoke, heat and radioactive conditions. Measurement accuracy is not too critical as the invention, which is suitable for working with micros, can accommodate a degree of error by correction elements in the micro programming. There is no call for slip rings or moving wires and hence there is the capability for the utmost reliability in the severest conditions. Whilst the movable member is preferably of magnetic material similar but small amplitude signals can be obtained with, for example, a movable conductive ring.

Figure 7:
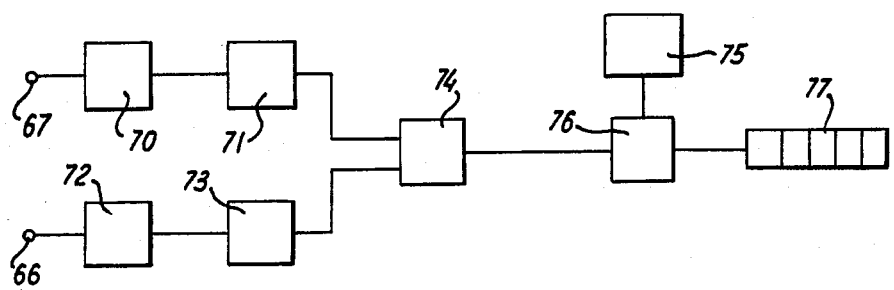
FIG. 7 shows a circuit for processing the output of the circuit of FIG. 6.

The processing of the signals derived from FIG. 6 is now illustrated with reference to FIG. 7. The primary input 67 is taken to an amplifier 70 and squarer 71 and the secondary output 66 is taken to a corresponding amplifier 72 and squarer 73. The leading edges of the output of the squarers 71, 73 are utilised in a latch 74 to derive respectively the leading and trailing edges of a square pulse which has its length measured in terms of pulses from a clock pulse generator 75 at an AND gate 76. This length is representative of phase difference between 67 and 66 and hence is representative of the position of a member moving along the array. This position is presented on a digital meter 77.

The circuit of FIG. 6 becomes ambiguous as between one pitch and any other after the first six coils 11A–11F have been passed by the moving member. This ambiguity can be removed by having further but different primary and secondary coil systems affected by the moving member. Typically this could give a further reading at a further meter 77. The two readings of the counters could be processed to give unambiguous information.

However, an improved unambiguous system in accordance with the invention can be obtained by having two differing secondary coil systems and taking the phase difference between the secondary coil systems as an unambiguous position measurement. This will now be illustrated with reference to FIGS. 8 and 9.

Figure 8:
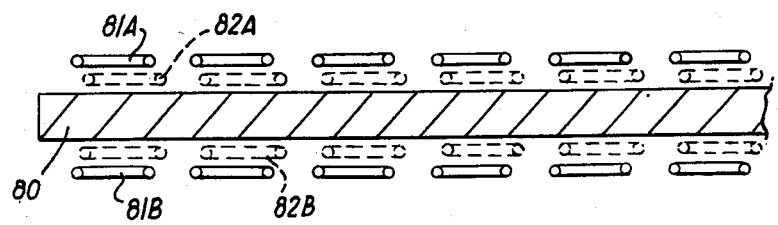
FIG. 8 is a sectional diagrammatic view of primary and secondary coil arrays on a printed circuit board.
Figure 9:
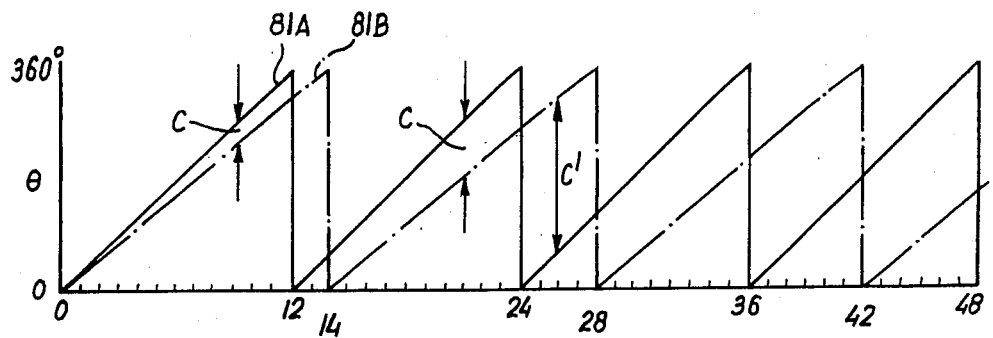
FIG. 9 is a graph showing the co-relation between outputs of two secondary arrays.

In FIG. 8 a printed circuit board 80 has an upper array of secondary coils 81A on its upper face and a lower array of secondary coils 81B on its lower face. The arrays are like that shown in FIG. 6. The primary system comprises coils 82A and 82B bifilar wound with coils 81A and 81B. The coils 81A are grouped twelve to a pitch (phase change of 30° per coil) and the coils 81B are grouped fourteen to a pitch (phase change of 360°/14° per coil). The spacing between coils is the same for both arrays. The output from these arrays are as shown in the graph of FIG. 9, namely, as a member of magnetic material moves along the array, there is a 360° phase change for each twelve coils of the upper array traversed and a 360° phase change for each fourteen coils of the lower array traversed. The difference in phase between the outputs 81A and 81B is represented by C and this is not ambiguous up to a maximum of a very large number of coils.

At certain points (e.g. C') the difference C will be measured as negative. When this is detected the actual value of C (which lies partly below 81A and partly above 81B) can be resolved by adding in a positive constant representative of the 360° ordinate.

This system describes with reference to FIGS. 8 and 9 lessens the risk of linearity errors.

In an alternative, the primary bifilar wound coils could be replaced with a single primary like that shown in FIG. 1 but these would require a multilayer printed circuit board.

In another system the coils need not have the same spacing nor the same numbers. A multilayer board is required. In such systems, to avoid one secondary system distorting the other, the primary system should be like that shown in FIG. 3.

The arrangement of FIG. 8 can be a linear scheme (like FIG. 2) or a circular scheme (like FIG. 3). The circular scheme on a single printed circuit board imposes the limitation that the coils of the upper and lower arrays must be of an even number. The FIG. 8 scheme may have, for example, in the upper array seven pitches each of twelve coils with a phase change (PC) of 30° and in the lower array six pitches each of fourteen coils with a phase change of 25.7°. An alternative scheme could have four pitches each of six coils with a phase change of 60° or three pitches each of eight coils with a phase change of 45°. Other combinations are possible.

In FIG. 10 the primary and secondary coils 11, 12 have been given a very pronounced length to width ratio and they are inclined to each other. This gives an output which is related to deviations in the "y" co-ordinate direction of a magnetic member which can move over them. The multiple coils 12 can be replaced with a single coil 12 in the manner of FIG. 1. This is illustrated in FIG. 11. The coils 11 now provide A and B inclined pairs.

Using this arrangement a deviation of a moving member from a given line can be determined. Whilst this is usually not significant in a linear system it is of value in a circular system where deviation from the given line may represent eccentricity of movement of the moving member. Such eccentricity gives rise to a positional error. If the accentricity can be measured then correction of the error can be made electrically. With skewed coils (like FIGS. 10 and 11) small two axis encoders are possible.

A two-axis printed circuit board arrangement is possible. One axis is shown in FIG. 12. The secondary coils 11, are provided within the boundary defined by the primary coil 12. These are seen to vary in length, as an element in the balancing of the coils. They also vary in number of turns and density as illustrated by FIGS. 12M and 12N. On the section represented by FIG. 12M four windings M11 of relatively lower density are provided whilst in FIG. 12N three windings N11 of higher density exist.

In FIG. 13 a shaft encoder is shown having secondary coils 11 arranged around the walls of a cylinder 95. The primary coil, or coils, are not shown but are provided in any of the ways above described. A shaft 93 has two arms 94 located at an angle to each other and the arms carry blades 96 of ferrite which move over the inside wall, and the secondary coils, of the cylinder. Coils 11 are provided and they are connected to form a number of pitches and further coils, in the manner of FIG. 8, form differing pitches. Two outputs from the pitches are obtained by virtue of the two arms and these are combined to give an improved signal-to-noise ratio with a degree of averaging of any errors.

In FIG. 14A the cross-section of the blades 96 are shown in to an enlarged scale and relative to a coil 11. The blade has a tapered part 96A. This, for the given conditions, gives a smooth progression of the phase shifted output from the coils 11 as the blades 96 move over the coils.

In FIG. 14B a pen 98 is shown. This has a cylindrical ferrite 97 with a tapered point 97A. Through the core of the cylinder a part 99 of the body of the pen extends. A coil 11 is shown. The lowermost point of the ferrite 97 is spaced from the coil 11 by a distance equal to 0.50 times the width W of the coil.

I claim:

1. Position sensing apparatus having mutually static, coupled primary and secondary coil systems defining a path (x), and an unenergized movable member, devoid of electrical connections, dimensionally much smaller than said path, serving as a localized flux augmenter between the coil systems, and whose position on the path defined by the coil systems is represented as a progressive phase-variable output from the secondary coil system, said output being nominally zero in the absence of said member, characterized in that:
   (a) the primary coil system (12) is single-phase energized:
   (b) the coils (11A, 11B ..., etc) of the secondary coil system (11) are:
      (i) disposed series connected in pairs (e.g. coils 11A, 11G in pair 11/1) interspaced with other pairs (coils 11B, 11H in pair 11/2) as an array of coils along said path,
      (ii) placed relative to the primary coil system so that on energization of that system the two coils of any pair have reversed polarity signals to generate said nominally zero output, and
      (iii) located relative to the movement of the unenergized member (60) so that they are close coupled with said member;
   (c) phase shift networks (PC1, PC2 etc) for each pair, or series connected sequence (I, II, III etc) of pairs of secondary coils, said networks giving an incremental phase shifted output as between one pair, or sequence of series connected pairs, and the next; and
   (d) means (65) combining the incremental phase shifted outputs to give a progressive phase shifted output (66) so that the position of the unenergized member is represented by said progressive output.

2. Apparatus as claimed in claim 1 in which the primary coil system comprises a coil which lies over (FIG. 1:FIG. 3) or around (FIG. 12) the secondary coil system.

3. Apparatus as claimed in claim 1 in which the primary coil system comprises an array of coils individual to respective coils of the secondary coil system (FIG. 2; FIG. 6).

4. Apparatus as claimed in claim 1 in which the coils (81A in FIG. 8) of the secondary coil system are arranged in successive pitches (P1. P2 etc. in FIG. 6) with each pitch representing 360° of phase change with means resolving ambiguity between the pitches, said means comprising a further secondary coil (81B) system with the same spacing between coils as in the first secondary coil system but having more, or less, coils per pitch so that a progressive phase shifted output (C in FIG. 9) is obtained which is the phase difference between the two secondary coil systems.

5. Apparatus as claimed in claim 1 in which the unenergised member is edge-chamfered to give a smooth progression of the phase shifted output as the member moves across the coils of the secondary coil system.

6. Apparatus as claimed in claim 2 in which the coils of the secondary coil system have differing lengths to give said nominally zero output.

7. Apparatus as claimed in claim 1 in which the unenergised member has multiple parts with the parts spaced apart and moving together (FIG. 13).

8. Apparatus as claimed in claim 1 in which the coils (31) of the secondary coil system are disposed on a circular array.

9. Apparatus as claimed in claim 1 in which the coils of the coil systems are given an oblique disposition whereby a deviation from movement of the unenergised member along a pure direction (x) can be detected.

* * * * *